Feb. 5, 1963 R. W. DOWLING ET AL 3,076,381
LENS CASING CONTROL MECHANISM FOR A BINOCULAR TELESCOPE
Filed Feb. 5, 1960 2 Sheets-Sheet 1
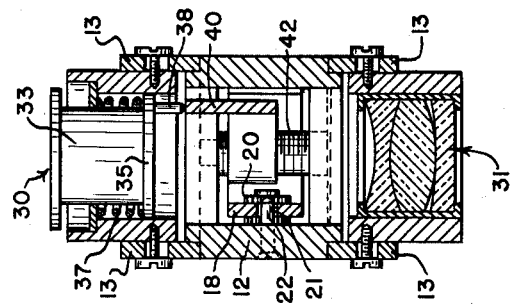
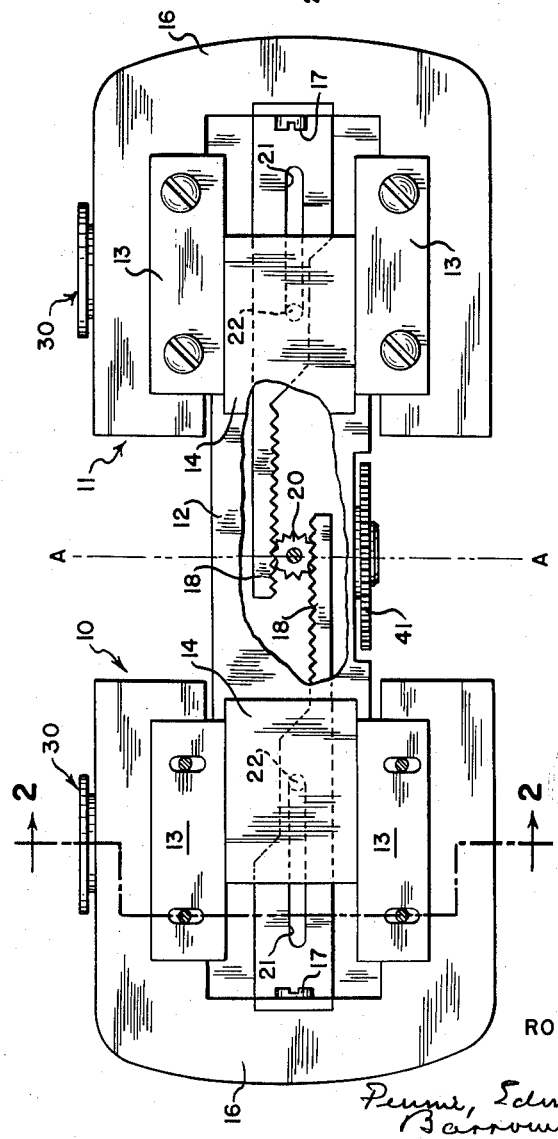
INVENTORS
ROBERT WHITTLE DOWLING
LORENZO del RICCIO
BY
ATTORNEYS

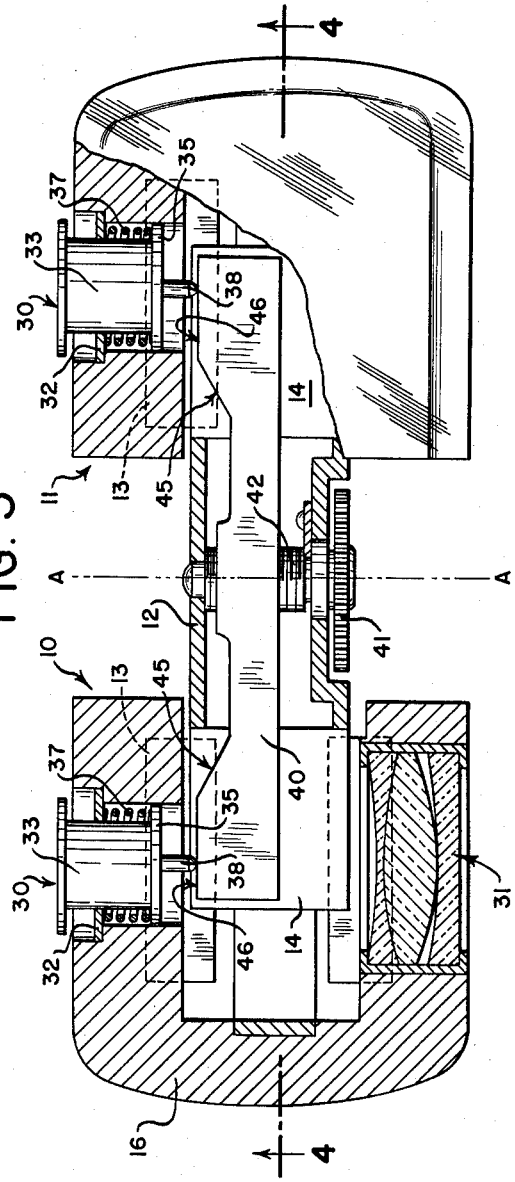

United States Patent Office 3,076,381
Patented Feb. 5, 1963

3,076,381
LENS CASING CONTROL MECHANISM FOR A BINOCULAR TELESCOPE
Robert Whittle Dowling, New York, N.Y., and Lorenzo Del Riccio, Los Angeles, Calif., assignors to D & D Company, Inc., New York, N.Y., a corporation of Delaware
Filed Feb. 5, 1960, Ser. No. 6,961
Claims priority, application Germany Feb. 13, 1959
3 Claims. (Cl. 88—34)

This invention relates to a binocular telescope and specifically to a lens casing control mechanism for a theater and sporting event binocular telescope.

In a binocular telescope having two compact, generally rectangular, box-like lens casings movably mounted on a central bridge type unitary support member, such as described in our co-pending application Serial No. 783,977, filed on December 30, 1958, extension of the lens casings from their carrying position frequently results in the lens casings becoming separated at unequal distances from the central plane of the instrument.

This is highly disadvantageous when the interpupillary distance of the viewer does not require the two casings to be moved into the extreme extended position for viewing. Under such conditions, one of the casings frequently reaches a stop or extreme extended position on the connecting bridge before the other casing begins to move. Thus, lens system focusing elements external of the unitary support member remain partially covered. This means that focusing is accomplished with difficulty or often with undesirable delay in cases of rapidly changing stage or sporting events.

Moreover, binocular telescopes of this nature are often used intermittently. Between each use they are normally put down in their resting or closed position. But, in closing, the focus setting is often moved which requires the focus for the object to be viewed to be adjusted anew whenever the cases are again held before the eyes. Under these conditions the disadvantageous features described become particularly acute.

This invention provides a casing control mechanism whereby external focusing elements are always readiy accessible when the lens casings are extended for use. This is done by coupling the two casings to each other in such a way that in their movement they are always equidistantly separated from the central plane of the binoculars. In this way the focusing elements are always midway between the casings regardless of the interpupillary distance of the viewer.

According to this invention the lens casings are interconnected by a gear drive. In this invention the motion of one of the casings is transmitted to the other by rack and pinion gears. Racks are rigidly mounted internal of the lens casings so as to mesh with a pinion. The pinion gear is rotatably mounted central and internal of a hollow connecting bridge type support member. Other coupling arrangements may comprise cable or chain linkages. However, the gear drive is preferred because it is positive acting and free of backlash.

The outward extension of the casings is limited in this invention by stop pins mounted inside the hollow central support member. Each of the racks presents a lengthwise slot disposed parallel to the directions in which the casings move. The pins in the central support are oriented so as to project into these slots. Said slots slide past the pins as the casings are moved along the support until their inner ends abut against the pins. Such action precludes further casing extension.

This invention also provides for refocusing of the lens systems during the intermittent use periods described. In conjunction with the equidistantly orienting features provided for the casings, this invention provides a focusing device which automatically moves the lenses to a preset focus position when the lens casings are separated for use. With this device a viewer need only adjust the binocular to accommodate his interpupillary distance during intermittent viewing of, for example, a stage event.

This is done by providing a focusing bar transverse the binocular. The bar is carried on the central bridge and extends parallel thereto, into the lens casings. The focusing bar is also made movable parallel to the plane of the bincoular optical axes for individual focus settings.

By means of entrainment elements provided, the ends of the focusing bar bear against movable ocular lens units of the binocular. The focusing bar automatically moves the lens units into the preset position when the lens casings are moved a slight distance from the closed carrying position. In this way a given lens setting can be maintained even when the lens casings are repeatedly moved away from each other and together again.

Alternatively, a focusing bar may be disposed so as to provide movement of objective elements too, if desired for a particular lens system.

The refocusing action is accomplished in this invention with inclined and parallel surfaces on the focusing bar. For movable ocular lens units, the inclined and parallel surfaces are located on the upper edge of the focusing bar. A sliding member of each lens unit is made to bear on these surfaces. As the casings are extended from the closed position the sliding member moves up the inclined surfaces. Said sliding members become located on the parallel surfaces after slight extension of the casings at which the separation of the lens system corresponds to a minimal interpupillary distance.

To insure that the sliding members of the lens units will bear against the focusing bar, this invention also provides reset elements for each movable lens. To reset elements of the invention comprise compression springs. The springs maintain the lens units in proper spaced relation from the focusing bar during focusing and also in cooperation with the said inclined surfaces, reset the lens units inside the casings when the casings are closed.

Often during use the focus setting of the ocular units cause the units to become partially exposed above the casing edges. The resetting action provided is advantageous in that the ocular lens units are always withdrawn into a protected position internal of the casings whenever the casings are closed.

The focusing bar of the invention is especially advantageous during intermittent binocular use. With this bar the oculars are automatically moved to the previously established focus position when the casings are separated for viewing. The viewer is thus enabled to follow changing stage events with great facility. He need only extend the casings so that the interocular separation accommodates the interpupillary distance of his eyes and he has no further requirement for focusing adjustments.

Moreover, with the casing coupling gears of the invention, the manipulatable focusing elements are made more rapidly and certainly accessible. This is especially advantageous in a darkened auditorium or theater where several viewers may use the same binocular.

These and other features of the invention are outlined in detail in the following description. To aid in an understanding of the description reference is made to the drawings in which:

FIG. 1 is a plan view of a binocular telescope in accordance with the invention, with the lens casings in the extended position, the covers of the casings removed and some parts shown broken away;

FIG. 2 is a cross section view taken along line 2—2 of FIG. 1 (with the covers removed);

FIG. 3 is a plan view of a partial mid-plane section of the binocular taken along line 3—3 of FIG. 4 (with a portion of one cover in place);

FIG. 4 is an elevation view of a mid-plane section of the binocular taken along line 4—4 in FIG. 3 (with the covers removed).

Referring to the drawings and particularly to FIGS. 1 and 3, it is shown that the binocular telescope comprises two lens casings 10 and 11 that are arranged on a hollow connecting bridge support member 12 so that they can be moved relative to each other in directions transverse the optical axes. To insure that the casings slide without tilting on the central support member, guide rails 13 are provided rigidly positioned on the casings 10 and 11 between which the tracking portions 14 of the unitary support member 12 slide.

Attached to the inside faces of the ends 16 of the casings 10 and 11 by means of screws 17 are two similar racks 18, which project into the central support. The racks 18 are longitudinally oppositely arranged so as to face each other. Both the said racks mesh with a pinion gear 20 that is rotatably supported on the center of an inside wall of hollow connecting bridge 12.

The racks 18 and pinion 20 gears operate such that when one of the casings is moved from the open position shown toward the other casing, the other casing is entrained and advanced toward the actuated casing. The two casings are as a result at all times equidistantly spaced from the central plane of the binocular telescope (the central plane being indicated by broken line A—A in FIGS. 1, 3 and 4).

To limit outward movement of the lens casings, the racks 18 present oblong holes 21 which mate with stop pins 22 mounted in the central bridge support member 12. As shown, pins 22 abut against the inner ends of holes 21 when the casings 10 and 11 are fully extended. The length of each hole 21 is thus provided approximately equivalent to the length of the total sliding distance of each lens casing.

In the lens system shown the ocular-eyepiece portions as a unit are marked 30 and the objectives are shown as a unit 31. Each of the ocular-eyepiece units comprises a lens, a sleeve 33 in which the ocular is mounted and an axially protruding sliding or transmission pin 38. The inner end of each sleeve 33 comprises a radially outwardly protruding flange 35 against the upper surface of which a compression spring 37 bears. Extending from the lower surfaces of flanges 35 and securely attached thereto are the axially protruding pins 38.

Each of the above mentioned coiled springs 37 is arranged between the casing wall and sleeve 33 with the upper end portions thereof bearing against shoulder 32 and the lower end portions bearing against flange 35 as described. The springs are at all times in compression and tend to force the ocular-eyepiece units 30 into positions such as that shown in FIGS. 2 and 3. The transmission pins 38 are therefore held firmly but slidably against a focusing bar 40.

Focusing bar 40 is supported in the binocular telescope parallel to the connecting bridge support member 12 and is at all times engaged by a rotatable focusing screw 42. Screw 42 is supported by the bridge 12 substantially parallel to the optical axes.

Attached to the outer or objective end of focusing screw 42 is a focusing wheel 41. By rotating wheel 41 and screw 42, the focusing bar 40 can be moved parallel to itself and to the plane of the optical axes to provide focusing adjustments. The lens casings are recessed to accommodate wheel 41 when the binocular is closed.

Focusing bar 40 presents at its upper edge portions parallel and inclined bearing surfaces, numbers 46 and 45 respectively. The parallel surfaces 46 are situated at the outer end portions of the focusing bar at equal distances from the binocular central plane. Said parallel surfaces join at their inner ends with the inclined surfaces 45.

When the lens casings are moved toward each other the pins 38 slide from the parallel surfaces to the inclined surfaces. When the casings, 10 and 11 are subsequently closed the aforesaid compression springs 37 cause the said pins 38 to transmit inclined surfaces 45. Through cooperation of the springs 37 and inclined surfaces, the ocular lens units 30 are thereby withdrawn to a protected position internal of the lens casings for carrying.

Subsequent extension of the casings 10 and 11 causes the pins 38 to slide up the inclined surfaces. The pins reach the juncture of inclined and parallel surfaces after slight casing movement on the central support 12. At that point the lens casing separation and consequently the interocular separation correspond to the minimum interpupillary accommodation distance of the binocular.

When the pins 38 again slide onto parallel surfaces 46, the ocular lens units are restored to a previous focus position such as that shown. The binocular then becomes ready for use as soon as the previous viewer achieves the desired interocular separation.

The parallel bearing surfaces 46 are each of a length corresponding approximately to half the length of the range of interocular viewing distances of the binocular. The transmission pins 38 will therefore bear on said parallel surfaces over the entire range of extended viewing positions.

It should be understood that the invention is not necessarily limited to the specific details set forth, accordingly, reference should be made to the attached claims in determining the full scope of the invention.

We claim:

1. In a binocular telescope having a pair of ocular-objective lens systems and two compact, generally rectangular box-like lens casings slideably supported upon a central support member for interpupillary distance accommodation, said lens systems being mounted in axial alignment in said lens casings with one of the lenses of each system being movable along its optical axis, said movable lenses of each of said systems being mounted in sleeves slideable with rspect to said casings along a respective optical axis, the improvement comprising each of said sleeves having a radially outwardly protruding flange, spring means intermediate said flange and the casing which mounts said movable sleeve for urging said lens sleeve toward and into the casing, a transverse focusing bar mounted within said central support member extending into each of said casings outside of the field of sight therethrough, means for adjusting said bar along the optical axes, said focusing bar having parallel and inclined bearing surfaces adapted to contact the inner ends of each of said movable lens sleeves in opposition to the spring urging of said sleeves toward said bearing surfaces, the inner ends of said movable lens sleeves being provided with a pin to make single point contact against said bearing surfaces, the parallel surfaces of said bar extending generally parallel to the central support and perpendicular to said optical axes, said parallel bearing surfaces being at each end of said bar and each parallel surface having a length approximately equivalent to half the length of the normal range of interpupillary distance accommodation of said binocular, the inclined bearing surfaces of said bar forming junctures with the ends of said parallel surfaces toward the central plane of the binocular, the inclined surfaces extending toward said central plane and being oriented inwardly toward a central point between the front and rear of said binocular, the extent of said inward orientation permitting the retraction of said movable lenses into the casings by said springs in all positions of said focusing bar along the optical axes upon transverse movement of the casings into adjacent contacting positions.

2. The binocular telescope of claim 1 in which means are provided for causing equilateral displacement of said lens casings relative to the central plane of the binocular.

3. The binocular of claim 2 in which the means for causing equilateral displacement comprises two similar rack gears disposed parallel to and within said central support, said rack gears being oppositely oriented with their outer ends rigidly affixed respectively to the inside of each of said casings on the end walls thereof, said racks being disposed longitudinally of said central support and having over their inner portions a plurality of teeth, a pinion mounted within said central support at the center thereof, said pinion being in simultaneous engagement with said racks and being rotatable in response to longitudinal motion of one said rack and the casing affixed thereto to cause equal longitudinal motion of the other of said racks and the casing affixed thereto.

References Cited in the file of this patent

UNITED STATES PATENTS

| 1,179,787 | Walter | Apr. 18, 1916 |
| 2,534,776 | Kershaw et al. | Dec. 19, 1950 |

FOREIGN PATENTS

| 256 | Great Britain | Nov. 3, 1900 |
| 364,747 | Germany | Dec. 1, 1922 |